US011656460B2

(12) United States Patent
Ha

(10) Patent No.: US 11,656,460 B2
(45) Date of Patent: May 23, 2023

(54) METHOD OF MANUFACTURING OPTICAL DEVICE WITH FIRST AND SECOND OPTICAL ELEMENTS HAVING REFLECTIVE UNITS

(71) Applicant: LETINAR CO., LTD, Seoul (KR)

(72) Inventor: Jeong Hun Ha, Seoul (KR)

(73) Assignee: LETINAR CO., LTD, Seoul (KR)

( * ) Notice: Subject to any disclaimer, the term of this patent is extended or adjusted under 35 U.S.C. 154(b) by 223 days.

(21) Appl. No.: 16/767,686

(22) PCT Filed: Nov. 29, 2018

(86) PCT No.: PCT/KR2018/014934
§ 371 (c)(1),
(2) Date: May 28, 2020

(87) PCT Pub. No.: WO2019/107959
PCT Pub. Date: Jun. 6, 2019

(65) Prior Publication Data
US 2020/0386995 A1     Dec. 10, 2020

(30) Foreign Application Priority Data

Nov. 29, 2017  (KR) ......................... 10-2017-0162088
Nov. 29, 2018  (KR) ......................... 10-2018-0150553

(51) Int. Cl.
*G02B 27/01*     (2006.01)
*G02B 1/04*      (2006.01)

(52) U.S. Cl.
CPC ............ *G02B 27/0172* (2013.01); *G02B 1/04* (2013.01); *G02B 2027/0194* (2013.01)

(58) Field of Classification Search
CPC ............................ G02B 27/0172; G02B 1/04
See application file for complete search history.

(56) References Cited

U.S. PATENT DOCUMENTS

2003/0165017 A1    9/2003  Amitai
2005/0163416 A1*   7/2005  Yamada ............... G02B 6/4214
                                                        385/14

(Continued)

FOREIGN PATENT DOCUMENTS

CN          105829952 A      8/2016
CN          205450445 U      8/2016

(Continued)

OTHER PUBLICATIONS

1st Office Action dated Aug. 16, 2021, by the foreign patent office in the counterpart Chinese patent application No. 2018800749416.

(Continued)

*Primary Examiner* — Kwang-Su Yang
(74) *Attorney, Agent, or Firm* — Rabin & Berdo, P.C.

(57) ABSTRACT

The present invention relates to a method of manufacturing an optical device, and provides a method of manufacturing an optical device, which includes: preparing first and second optical elements having a pair of corresponding surfaces; forming a reflective unit on the surface of the first optical element selected from the pair of corresponding surfaces; and forming an optical device by bringing the first and second optical elements into close contact with each other and fastening them to each other.

1 Claim, 9 Drawing Sheets

(56) References Cited

U.S. PATENT DOCUMENTS

| | | | |
|---|---|---|---|
| 2008/0062542 A1* | 3/2008 | Kogure | B32B 27/08 |
| | | | 359/838 |
| 2008/0239422 A1 | 10/2008 | Noda | |
| 2008/0273246 A1 | 11/2008 | Moliton et al. | |
| 2015/0226970 A1* | 8/2015 | Mukawa | G02B 27/0172 |
| | | | 345/8 |
| 2018/0203229 A1* | 7/2018 | Lu | G02B 17/0856 |

FOREIGN PATENT DOCUMENTS

| | | |
|---|---|---|
| JP | H11305016 A | 11/1999 |
| JP | 2002268057 A | 9/2002 |
| JP | 2003536102 A | 12/2003 |
| JP | 2004062051 A | 2/2004 |
| JP | 2008268873 A | 11/2008 |
| JP | 2013043329 A | 3/2013 |
| JP | 2016170372 A | 9/2016 |
| JP | 2017122784 A | 7/2017 |
| JP | 2017146448 A | 8/2017 |
| KR | 100360474 B1 | 10/2002 |
| KR | 1020070026887 A | 3/2007 |
| KR | 101660519 B1 | 9/2016 |

OTHER PUBLICATIONS $2^{nd}$ Office Action dated Apr. 2, 2022, by the foreign patent office in the counterpart Chinese patent application No. 2018800749416.
Office Action dated Aug. 4, 2020, by the foreign patent office in the counterpart Korean patent application No. 10-2018-0150553.
Office Action dated Feb. 25, 2022, by the foreign patent office in the counterpart Korean patent application No. 10-2021-0047156.

* cited by examiner (a)            (b)            (c)

METHOD OF MANUFACTURING OPTICAL DEVICE WITH FIRST AND SECOND OPTICAL ELEMENTS HAVING REFLECTIVE UNITS

TECHNICAL FIELD

The present invention relates generally to a method of manufacturing an optical device, and more particularly to a method of manufacturing an optical device, which is capable of efficiently manufacturing an optical device inside which a small-sized reflective unit is disposed.

BACKGROUND ART

Augmented Reality (AR) is technology that overlaps a virtual screen (a virtual world) and the real world viewed by a user with the eye and then shows the overlapping worlds. In the early days thereof, it was often called "Mixed Reality" because it adds a virtual world having additional information to the real world in real time and then shows a single image.

This augmented reality began to be researched based on the development of see-through head-mounted displays (HMDs), and has a meaning different from that of virtual reality. "Virtual Reality (VR)" allows a user to immerse into a virtual environment, and thus the user cannot see a real environment. In contrast, augmented reality allows a user to see a real environment, and takes the form of a mixture of a real environment and a virtual object. In other words, virtual reality is different from augmented reality in that virtual reality shows a virtual world to a user in replacement of the real world whereas augmented reality complements and shows the real world to a user by overlapping the real world and a virtual object.

HMDs are mainly used to implement such augmented reality. A problem arises in that Most of the lens modules (optical system modules) of HMDs are very difficult to manufacture because they have complicated structures. Another problem arises in that due to the complex structures, the sizes of the lens modules are large and the weights thereof are heavy.

In order to overcome the problems of the conventional apparatuses for implementing augmented reality, the present applicant proposed an augmented reality implementation apparatus, such as that disclosed in Korean Patent No. 10-1660519. This augmented reality implementation apparatus increases Depth of Field (DoF) and also generates a type of pinhole effect by using a small-sized reflective unit and thus provides a clear virtual image at all times regardless of a user changing a focal distance, thereby providing improved augmented reality service compared to the prior art.

However, the manufacture of such a small-sized reflective unit has not yet been normalized, and it is true that the mass production thereof has great difficulties.

For an optical device using a small-sized reflective unit, methods that can be contemplated based on the prior art are as follows:

First, in a first method, a large reflective unit is prepared, only a small reflective portion to be used is left, and other areas are painted, thereby fabricating a type of mask. In this method, since the mask acts as a slit, problems arise in that a diffraction phenomenon occurs, it is difficult to perform painting while clearly distinguishing a boundary portion, and the reflective unit may be easily contaminated during a process.

As a second method, there may be contemplated a method of preparing a large reflective unit and cutting out the remaining area while leaving only a small reflective area to be used. However, this method has problems in that precise cutting is difficult due to unintentional curvature or wear and the reflective unit may be easily contaminated.

PRIOR ART DOCUMENT

The publication of Korean Patent No. 10-1660519 (published on Sep. 29, 2016)

DISCLOSURE

Technical Problem

The present invention has been conceived to overcome the above-described problems, and an object of the present invention is to provide a method of manufacturing an optical device in which a small-sized reflective unit can be disposed inside an optical element.

Technical Solution

In order to accomplish the above object, the present invention provides a method of manufacturing an optical device, the method including: preparing first and second optical elements having a pair of corresponding surfaces; forming a reflective unit on the surface of the first optical element selected from the pair of corresponding surfaces; and forming an optical device by bringing the first and second optical elements into close contact with each other and fastening them to each other.

In this case, the first and second optical elements are preferably made of the same material having the same refractive index.

Furthermore, the pair of corresponding surfaces of the first and second optical elements are preferably formed to come into close contact with each other when being brought into contact with each other.

Furthermore, the pair of corresponding surfaces may be formed to be inclined with respect to the thickness direction of the first and second optical elements.

Furthermore, the thickness direction is preferably a direction in which a user views the optical device from his or her pupil when the user wears an augmented reality implementation apparatus including the optical device.

Furthermore, forming the optical device by bringing the first and second optical elements into close contact with each other and fastening them to each other preferably includes adhering the first and second optical elements to each other with an adhesive made of a material having the same refractive index as the first and second optical elements.

Furthermore, forming the optical device by bringing the first and second optical elements into close contact with each other and fastening them to each other preferably includes forming the optical device by curing the first and second optical elements adhered with the adhesive.

Furthermore, the pair of corresponding surfaces of the first and second optical elements and the reflective unit may be formed to have curved surfaces.

According to another aspect of the present invention, there is provided a method of manufacturing an optical device, the method including: preparing an optical element having an inclined surface; forming a reflective unit on the inclined surface of the optical element; immersing the optical element, on which the reflective unit is formed, in a resin having the same refractive index as the optical element; and curing the resin in which the optical element and the reflective unit are immersed.

Furthermore, the inclined surface is preferably formed to be inclined with respect to the thickness direction of the optical element.

Furthermore, the thickness direction is preferably a direction in which a user views the optical device from his or her pupil when the user wears an augmented reality implementation apparatus including the optical device.

Furthermore, the resin is preferably made of the same material as the optical element.

Further Lore, the inclined surface of the optical element and the reflective unit may be formed to have curved surfaces.

According to still another aspect of the present invention, there is provided a method of manufacturing an optical device, the method including: preparing first and second optical elements having a plurality of pairs of corresponding surfaces; forming a reflective unit on the surface of the first optical element selected from each of the plurality of pairs of corresponding surfaces; and forming an optical device by bringing the first and second optical elements into close contact with each other and fastening them to each other.

Advantageous Effects

The present invention is directed to the method of manufacturing an optical device, which is capable of manufacturing an optical device in which a small-sized reflective unit is disposed inside an optical element.

Furthermore, according to the present invention, an optical device in which a small-sized reflective unit can be disposed inside an optical element can be provided, and thus it can operate as a complete see-through lens, thereby providing an optical system that is particularly suitable for augmented reality implementation apparatuses.

In particular, an optical device manufactured according to the present invention can minimize the occurrence of ghost images attributable to residual reflection or refraction on the bonding surface of an optical element, thereby providing the effect of increasing depth of field in a reflective unit and also providing the advantage of maintaining the pinhole effect.

Furthermore, according to the present invention, advantages arise in that a diffraction phenomenon does not occur because a slit is not used to form a reflective unit inside an optical element, physical and chemical durability is high and long-term performance can be maintained because a reflective surface is located inside the optical element, and various curvatures, shapes, sizes, and shapes can be easily adjusted.

Moreover, according to the present invention, there can be provided the method of manufacturing an optical device, which is suitable for mass production and can reduce manufacturing cost.

BEST MODE

Preferred embodiments of the present invention will be described in detail below with reference to the accompanying drawings so that those having ordinary skill in the art to which the present invention pertains may easily practice the present invention.

First, there will be described an augmented reality implementation apparatus 100 to which an optical device 10 according to the present invention is applied. This augmented reality implementation apparatus 100 is based on the descriptions given in Korean Patent No. 10-1660519 filed and registered by the present applicant.

Figure 1:
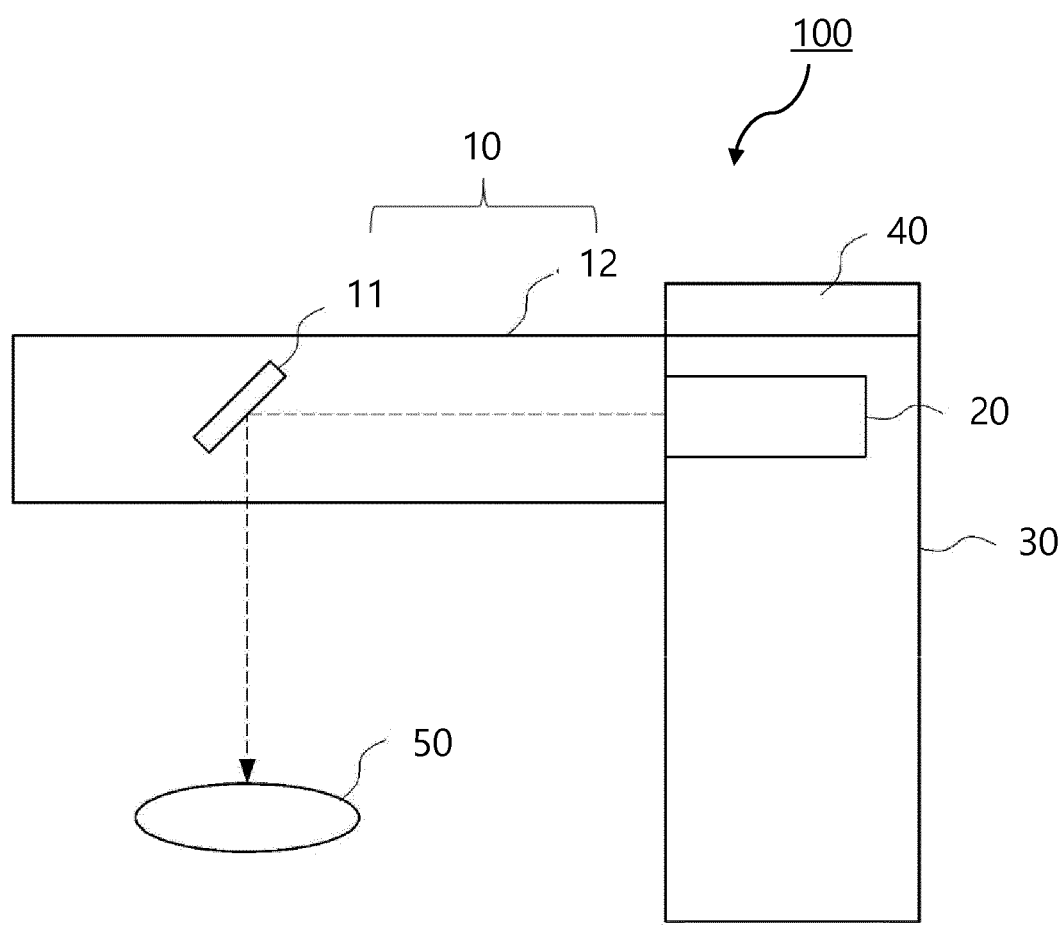
FIG. 1 is a diagram schematically showing the configuration of an augmented reality implementation apparatus (100) to which an optical device (10) according to the present invention is applied.

FIG. 1 is a diagram schematically showing the configuration of the augmented reality implementation apparatus 100 to which the optical device 10 according to the present invention is applied.

Referring to FIG. 1, the augmented reality implementation apparatus 100 includes the optical device 10 including a reflective unit 11 and an optical element 12, an image output unit 20 outputting image light corresponding to an image for augmented reality, and a frame unit 30 supporting the optical device 10.

The reflective unit 11 functions to reflect image light corresponding to an image for augmented reality output from the image output unit 20 and to transfer it to the pupil 50, and the reflective unit 11 is disposed inside the surfaces of the optical element 12.

Furthermore, the augmented reality implementation apparatus 100 may further include an image capturing module 40 that captures an image.

The image output unit 20 is a means for outputting image light corresponding to an image for augmented reality to the reflective unit 11, and may be, e.g., a display device such as a small-sized LCD.

The display device is a means for displaying an image for augmented reality on a screen. The display device displays an image for augmented reality by way of emitting image light corresponding to the image so that the reflective unit 11 reflects the image for augmented reality to be projected into the pupil of a user. The image light corresponding to the displayed image for augmented reality are emitted from the display device and transferred to the reflective unit 11.

The display device is a means for outputting an image for augmented reality and there is no special limitation on the size, type and shape of the display device as long as the display device outputs any images such as still images or moving images.

The display device may output an image transmitted from an external electronic device, e.g., a smartphone, via wireless communication function such as Bluetooth or Wi-Fi, and may receive and output an image, captured by the image capturing module 40, via a wired or wireless communication function.

The connection of wired or wireless communication between the image capturing module 40 and the display device may be implemented using various methods (e.g., a communication line that is connected through the frame unit 30). Since this is obvious to those skilled in the art, a detailed description thereof will be omitted.

Meanwhile, the image output unit 20 may be a reflecting or refracting means that is disposed between the above-described display device and the reflective unit 11 and transfers image light, output from the display device, to the reflective unit 11 through reflection or refraction. In this case, the image light output from the display device is transferred to the reflective unit 11 through the reflecting or refracting means without being output directly to the reflective unit 11.

Furthermore, the image output unit 20 may be a collimator that outputs image light, output from the display device, as collimated parallel light. Alternatively, the collimator may be disposed in the reflecting or refracting means or the display device.

In other words, the image output unit 20 refers to various means such as the display device that displays an image for augmented reality, the reflecting or refracting means that finally transfers image light, output from the display device, to the reflective unit 11, etc.

In this case, the image for augmented reality refers to an image that is displayed on the display device and corresponds to a virtual image that is provided through the pupil to a user via the reflective unit 11. The image for augmented reality may be a still image or moving picture. The image for augmented reality is output as corresponding image light, and is provided through the pupil of a user via the reflective unit 11 as a virtual image. The user is provided with augmented reality service by additionally receiving a real-world image that is directly recognized by the user with his or her eye.

Meanwhile, although the image output unit 20 is disposed in the upper portion based on a case where a user gazes forward in FIG. 1, it is not limited thereto, but may be disposed in a side or the upper or lower location of a diagonal line. For example, when the augmented reality implementation apparatus is implemented, for example, in the form of glasses, the image output unit 20 may be disposed at an appropriate location of a glass frame.

Meanwhile, the display device may have only the function of receiving an image signal from an external image playback device and simply displaying an image, or may be integrated with a device that has a processor, memory and the like therein and also has the function of storing and playing back an image.

Since the display device itself is not a direct target of the present invention and a conventionally known device capable of displaying an image on a screen may be employed, a detailed description thereof will be omitted.

The reflective unit 11 reflects the image light corresponding to the image for augmented reality output from the image output unit 20 so that the image light reaches the pupil 50 of the user.

In other words, the reflective unit 11 performs the function of providing the image for augmented reality to the user by reflecting the image light corresponding to the image for augmented reality, output from the image output unit 20, to the pupil 50 of the eye of the user.

The reflective unit 11 reflects the image light corresponding to the image for augmented reality, output from the image output unit 20, to the pupil 50, and thus provides the image for augmented reality and a real-world image in an overlapped form, thereby providing augmented reality service. In other words, the reflective unit 11 may provide the image for augmented reality, displayed on the display device, to the user by reflecting the image light, output from the image output unit 20, to the pupil 50 of the eye of the user.

For this purpose, the reflective unit 11 is disposed at an appropriate angle between the image output unit 20 and the pupil 50. Preferably, it is disposed at an angle that allows the image light incident on the center of the reflective unit 11 to be reflected and enter the center of the pupil 50 when the reflective unit 11 is located in front of the pupil 50 of the user.

For example, it is assumed that in FIG. 1, the reflective unit 110 is located in front of the pupil 50 and the image output unit 20 is located at side direction with respect to the front direction from the pupil 50 when the user gazes forward. Accordingly, in this case, the reflective unit 11 is inclined at an inclination angle of about 45 degrees, as shown in FIG. 1.

It is preferable that the reflective unit 11 is smaller than the size of the pupil of a human. In general, the size (diameter) of the pupil of a person is known to be in the range of 2 to 8 mm on average, and thus the reflective unit 11 in the present invention preferably has a size of 8 mm or less. Here, the size of the reflective unit 11 is defined to mean the maximum length between any two points on the boundary line of the reflective unit 11.

When the reflective unit 11 is formed smaller than the pupil as described above, the depth of field (DoF) for light entering the pupil through the reflective unit 11 gets much deeper. Here, the depth of field (DoF) refers to a range within which an image for augmented reality is recognized as being in focus. When the depth of field gets deeper, a focal distance for an image for augmented reality gets deeper. Accordingly, even when the user changes the focal distance for the real world while gazing at the real world, an image for augmented reality is always recognized as being in focus regardless of changing the focal distance for the real world. This may be viewed as a type of pinhole effect.

That is to say, in the present invention, the size of the reflective unit 11 is formed smaller than that of the pupil, thereby allowing the user to recognize an image through the pinhole effect based on human visual recognition characteristics. Accordingly, the user may view an virtual image having deeper depth of field through the pinhole effect.

FIG. 1 is intended to help to understand the present invention, and the image output unit 20 and the reflective unit 11 are drawn at scales somewhat different from a scale based on the actual sizes thereof.

The reflective unit 11 may be formed in various shapes such as circular, elliptical, and polygonal shapes on a plane. The diameter or the length of the minor axis may range from 0.3 to 6 mm. When the diameter or the length of the minor axis is 0.3 to 4 mm, the better pinhole effect may be achieved.

In an embodiment, the reflective unit 11 may be formed in a shape having a minor axis and a major axis, such as a rectangle or an ellipse. As shown in FIG. 1, since the reflective unit 11 is disposed in an inclined state, it may be seen as a square or a circle when viewed from the location of the pupil 50 of the user.

Furthermore, the reflective unit 11 may be formed such that the diameter or the length of the minor axis thereof is 2 mm or less. When the size of the reflective unit 11 is 2 mm or less, the reflective unit 11 may be formed smaller than the pupil of a human at any time.

Furthermore, the reflectivity of the reflective unit 11 is preferably configured to be very close to 100%. For this purpose, the reflective unit 11 may be made of a metal material. For example, the reflective unit 11 may be made of aluminum (Al) or silver (Ag), and various types of metals, alloys, or synthetic resins may be used.

Furthermore, the reflective unit 11 may be composed of optical elements made of various materials. For example, it may be composed of a holographic optical element to enable diffraction grating reflection. In this case, an image obtained by the user has a holographic form. Furthermore, a different type of element other than a holographic optical element may be used to enable diffraction grating reflection.

The optical element 12 may be a lens that transmits at least part of visible light therethrough, and the reflective unit 11 is disposed therein, as shown in FIG. 1.

Here, transmitting at least part of visible light therethrough means that the transmittance of the visible light is in the range of 0 to 100%. Assuming that the reflective unit 11 is located in front of the pupil 50 of the eye of the user, as shown in FIG. 1, the optical element 12 outputs image light corresponding to an image for augmented reality, output from the image output unit 20, to the pupil 50 by reflecting the image light using the reflective unit 11 while recognizing a real-world image via the pupil 50, and thus provides the real-world image and the image for augmented reality in an overlapped form, thereby providing augmented reality service. In other words, the optical element 12 functions to transfer the real-world image to the pupil 50 of the user through transmission and simultaneously transfer the image light from the image output unit 20 to the pupil 50 through reflection by the reflective unit 11 while holding the reflective unit 11.

For example, the optical element 12 may be implemented in the form of a rectangular lens module, and the lens module may be detachably coupled to an augmented reality apparatus in the form of glasses. Alternatively, when the augmented reality implementation device 100 is implemented in the form of glasses, it may be implemented in the form of the lenses of glasses.

The frame unit 30 is a means for fastening and supporting the optical device 10 and the image output unit 20. For example, when the augmented reality implementation apparatus 100 is implemented in the form of glasses, the frame unit 30 may be a glass frame.

Next, a method of manufacturing the optical device 10 according to the present invention that is applied to the augmented reality implementation apparatus 100 described in FIG. 1 will be described with reference to FIG. 2 below.

Figure 2:
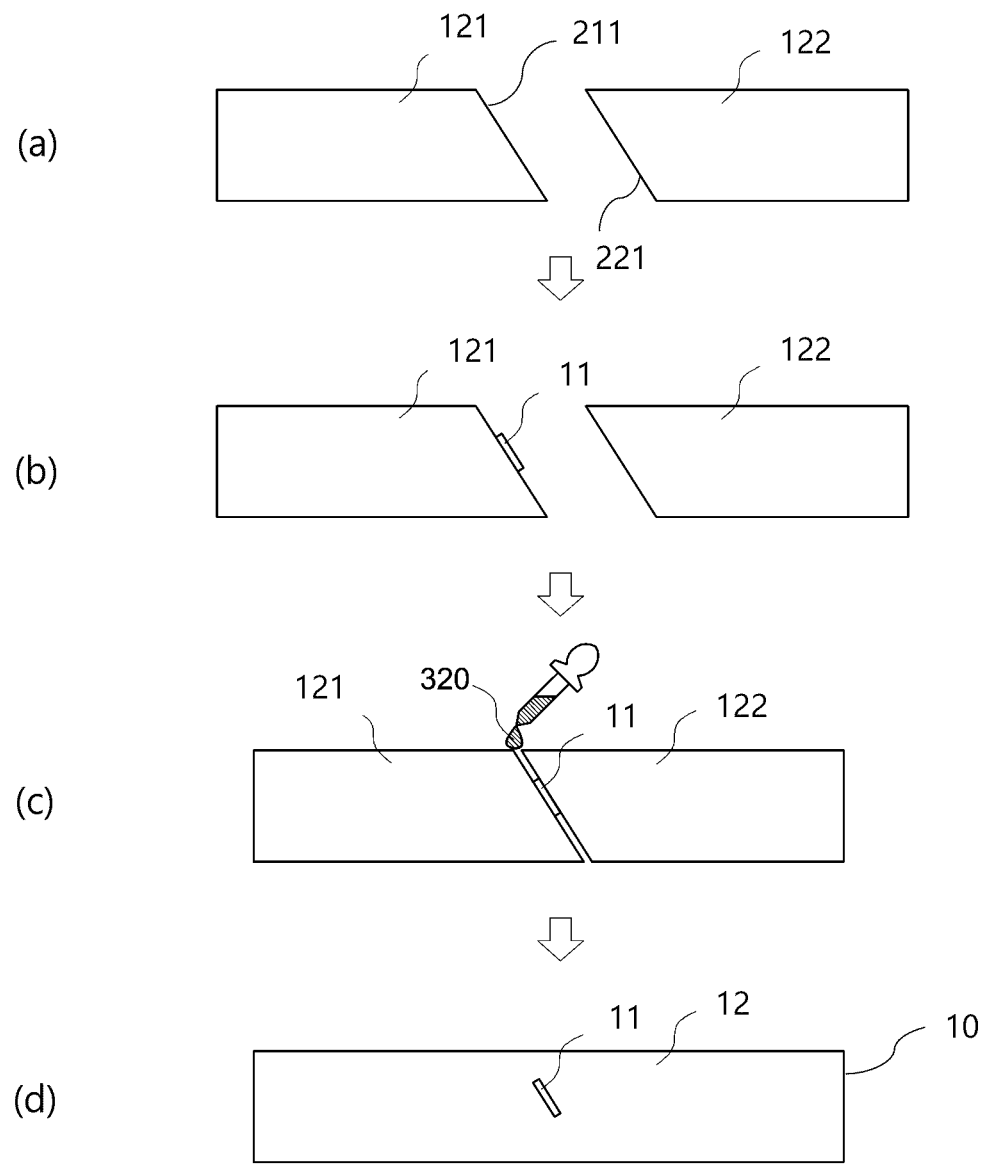
FIG. 2 is a view illustrating a method of manufacturing the optical device (10) according to a first embodiment of the present invention.

FIG. 2 is a view illustrating a method of manufacturing the optical device 10 according to a first embodiment of the present invention.

Referring to FIG. 2, first, as shown in FIG. 2(a), first and second optical elements 121 and 122 having a pair of corresponding surfaces are prepared.

As described with reference to FIG. 1, the first and second optical elements 121 and 122 may be lenses that transmit at least part of visible light therethrough, and are made of the same material having the same refractive index.

The first and second optical elements 121 and 122 each have a predetermined thickness and length. In FIG. 2, a thickness direction is the vertical direction in the drawing, and a longitudinal direction is the lateral direction.

The thickness direction of the first and second optical elements 121 and 122 is the direction in which the user views the optical device 10 from the pupil 50, more precisely the direction in which the user views the reflective unit 11 disposed inside the optical device 10, when the optical device 10 is applied to the augmented reality implementation apparatus 100 after being manufactured, as shown in FIG. 2(d), and then the user wears the augmented reality implementation apparatus 100.

In this case, when the pair of corresponding surfaces of the first and second optical elements 121 and 122 are referred to as a first surface 211 and a second surface 221, respectively, the pair of corresponding first and second surfaces 211 and 221 are formed to be brought into close contact with each other and are inclined with respect to the thickness direction.

The angle of inclination in the thickness direction is the same as the angle at which the reflective unit 11 is disposed as described with reference to FIG. 1. In other words, when the pair of corresponding first and second surfaces 211 and 221 are brought into close contact with each other, the angle of inclination with respect to the thickness direction is determined according to the angle at which the reflective unit 11 needs to be disposed in order to reflect the image light from the image output unit 20 to the pupil 50. Accordingly, the first and second optical elements 121 and 122 are prepared in such a manner that the angle of disposition of the reflective unit 11 required in the augmented reality implementation apparatus 100 is calculated in advance and the angle of inclination of the first and second surfaces 211 and 221 with respect to the thickness direction is set to correspond to the angle of disposition.

In this case, the angle at which the reflective unit 11 is disposed in the augmented reality implementation apparatus 100 may be variously determined according to the location of the image output unit 20 and the location of the reflective unit 11 relative to the pupil 50.

Next, as shown in FIG. 2(b), the reflective unit 11 is formed on the first surface 211 of the first optical element 121.

The reflective unit 11 may be made of an inorganic material, such as a metal or an oxide, or an organic material, and a suitable coating method may be used according to each of the material to be used. For example, when the reflective unit 11 is made of a metal material such as aluminum, an exposure deposition or mask deposition method used in a semiconductor process may be employed. Since the deposition method itself is known by the prior art and it is not a direct objective of the present invention, a detailed description thereof will be omitted here.

As another method, there may be used a method in which the reflective unit 11 is generated in advance and adhered using a sticker or the like.

When the reflective unit 11 is formed on the first surface 211 of the first optical element 121, the first and second optical elements 121 and 122 are brought into close contact with and fastened to each other, as shown in FIG. 2(c).

Bringing and fastening the first and second optical elements 121 and 122 into close contact with and to each other may be performed, for example, by a method of adhering the first and second optical elements 121 and 122 to each other with an adhesive 320 made of a material having the same refractive index as the first and second optical elements 121 and 122.

After the above step, a curing step of curing the first and second optical elements 121 and 122 adhered as shown in FIG. 2(d) is performed and the optical element 12 having the same refractive index for the overall element except for the reflective unit 11 may be formed, and then the optical device 10 may be manufactured using the optical element 12 and the reflective unit 11.

The embodiment of FIG. 2 has the following advantages:

1) Residual reflection does not occur at the adhering surface between the reflective unit 11 and the optical elements 121 and 122, and thus the pinhole effect is maintained.

2) A slit is not used, and thus a diffraction phenomenon is reduced.

3) The reflective unit 11 is located inside the optical elements 121 and 122, and thus physical and chemical durability is high.

4) The embodiment is advantageous for precision processing (curvature, shape, size, and shape adjustment).

5) When a plurality of reflective units 11 is implemented, the embodiment is advantageous for the manufacture of a plurality of small-sized reflective units 11.

Figure 3:
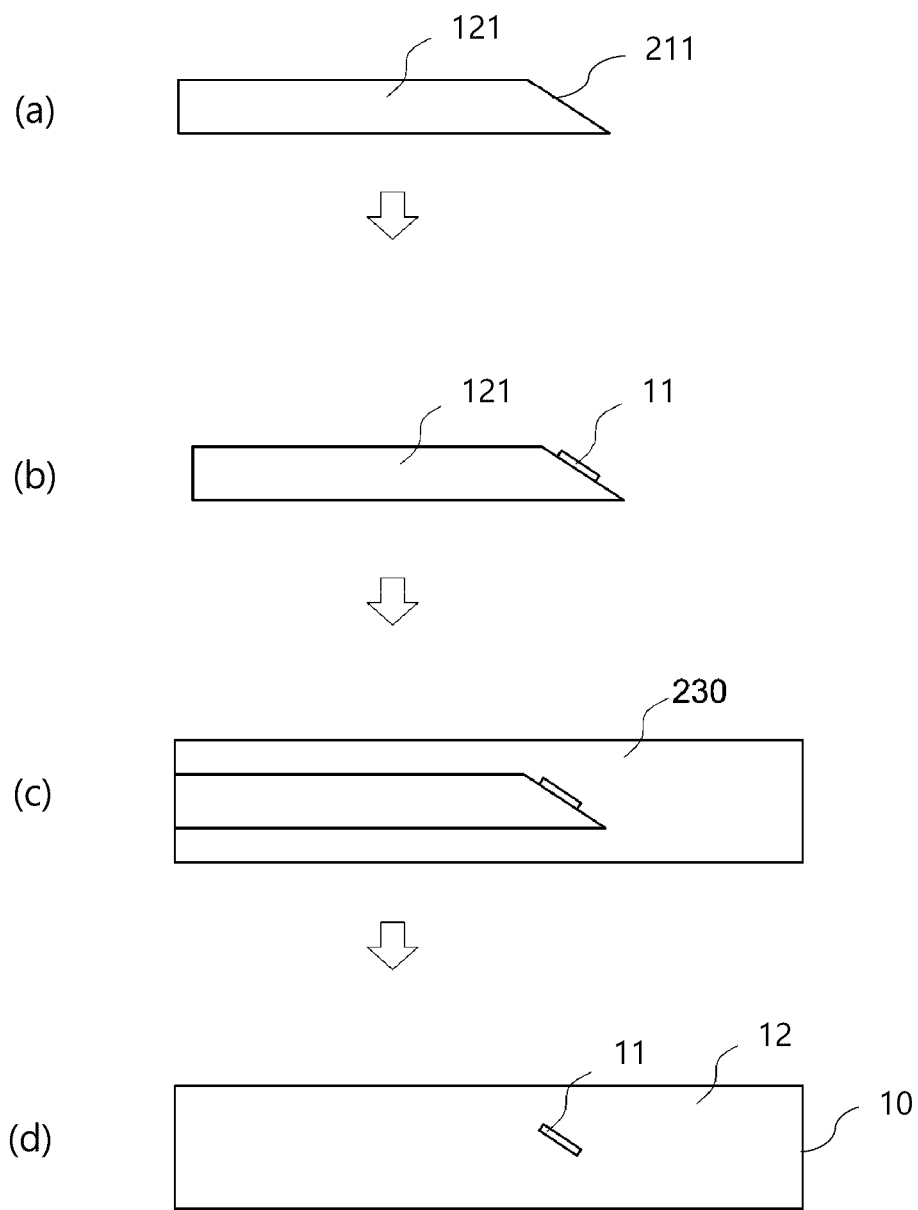
FIG. 3 is a view showing a method of manufacturing the optical device (10) according to a second embodiment of the present invention.

FIG. 3 is a view showing a method of manufacturing the optical device 10 according to a second embodiment of the present invention.

Referring to FIG. 3, first, as shown in FIG. 3(a), an optical element 121 having an inclined surface 211 is prepared. This optical element 121 is the same as the first optical element 121 shown in FIG. 2.

As shown in FIG. 1, the optical element 121 may be a lens that transmits at least part of visible light therethrough. As described in conjunction with the embodiment of FIG. 2, the optical element 121 also has a predetermined thickness and length. In FIG. 3, a thickness direction is the vertical direction in the drawing, and a longitudinal direction is a lateral direction.

As described in conjunction with the embodiment of FIG. 2, the thickness direction of the optical element 121 is the direction in which the user views the optical device 10 from the pupil 50, more precisely the direction in which the user views the reflective unit 11 disposed inside the optical device 10, when the optical device 10 is applied to the augmented reality implementation apparatus 100 after being manufactured, as shown in FIG. 2(d), and then the user wears the augmented reality implementation apparatus 100. The inclined surface 211 of the optical element 121 is inclined with respect to the thickness direction.

The angle of inclination in the thickness direction is the same as the angle at which the reflective unit 11 described with reference to FIG. 1 is disposed. In other words, the angle of inclination at which the inclined surface 211 is inclined with respect to the thickness direction of the optical element 121 is determined according to the angle at which the reflective unit 11 needs to be disposed in order to reflect the image light from the image output unit 20 to the pupil 50. Accordingly, the optical element 121 is prepared in such a manner that the angle of disposition of the reflective unit 11 required in the augmented reality implementation apparatus 100 is calculated in advance and the angle of inclination of the inclined surface 211 with respect to the thickness direction is set to correspond to the angle of disposition.

In this case, the angle at which the reflective unit 11 is disposed in the augmented reality implementation apparatus 100 may be variously determined according to the location of the image output unit 20 and the location of the reflective unit 11 relative to the pupil 50.

Next, as shown in FIG. 3(b), the reflective unit 11 is formed on the inclined surface 211 of the first optical element 121.

As described in conjunction with the embodiment of FIG. 2, the reflective unit 11 may be made of materials, such as a metal, an oxide, and an organic material. The reflective unit 11 may be foiled on the inclined surface 211 by an exposure deposition or mask deposition method used in a semiconductor process.

Alternatively, there may be used a method in which the reflective unit 11 is generated in advance and adhered using a sticker or the like.

After the reflective unit 11 is formed on the inclined surface 121, the optical element 121 is immersed in a resin 230 having the same refractive index as the optical element 121.

In this case, it is suitable that the resin 230 should have the same refractive index as the optical element 121 so that refraction or reflection occurs at a boundary surface and thus light is transmitted. For example, if the refractive index of the optical element 121 is 1.516, a material having a refractive index of 1.516 as the resin 230 when the material is cured is suitable.

Furthermore, it is preferable that the optical element 121 and the resin 230 have the same thermal expansion coefficient so that bonding force can be maintained even at various temperatures.

Furthermore, it is preferable that a material has good affinity for the optical element 121 and the resin 230 and thus maintains bonding force for a long time.

When these are taken into consideration, it is preferable that the optical element 121 and the resin 230 are made of the same material.

When the step of curing the resin 230 in which the optical element 121 and the reflective unit 11 are immersed, as shown in FIG. 3(d), is performed after the above step, the optical element 12 having the same refractive index for the overall element except for the reflective unit 11 may be formed, and then the optical device 10 may be manufactured using the optical element 12 and the reflective unit 11.

The embodiment of FIG. 3 also has the same advantages as that of FIG. 2.

Figure 4:
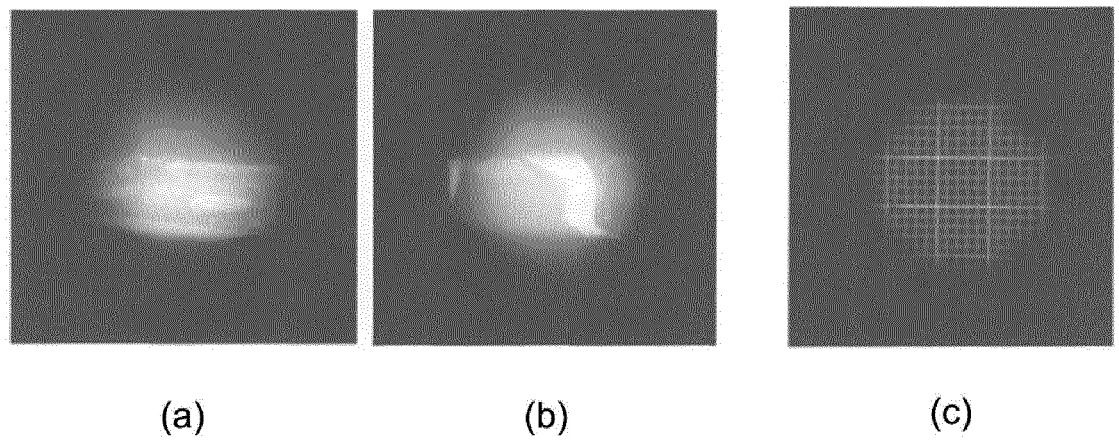
FIG. 4 shows photographs comparing an optical device having a reflective unit manufactured by a conventional method and the optical device (10) manufactured by the present invention.

FIG. 4 shows photographs comparing an optical device having a reflective unit manufactured by a conventional method and the optical device 10 manufactured by the present invention.

As the conventional method, there is used a method in which a reflective unit is prepared and a partial reflective surface is obtained by coating an overall region except for a reflective portion to be used.

When the optical device is manufactured by the conventional method, a blurry and low-resolution image is generated due to the residual reflection and diffraction of the image, as shown in FIGS. 4(a) and 4(b). When the optical device 10 is manufactured according to the embodiment of the present invention, it is found that ghost images may be minimized due to minimized residual reflection or refraction and a clear resolution may always be achieved because a diffraction phenomenon rarely occurs, as shown in 4(c).

Figure 5:
FIG. 5 is a photograph showing a virtual image viewed via the optical device (10) manufactured according to the embodiment of the present invention and a real object.

FIG. 5 is a photograph showing a virtual image viewed via the optical device 10 manufactured according to the embodiment of the present invention and a real object.

In FIG. 5, the can on the left is a virtual image viewed via the optical device 10 according to the present invention, and the can on the right is an image of a real object. When the virtual image and the real object are compared with each other, it can be seen that the virtual image obtained by the optical device 10 according to the present invention also has a high resolution. Accordingly, when the optical device 10 according to the present invention is used, an optical system operating as a complete see-through lens may be obtained, and an augmented reality implementation apparatus capable of obtaining a clearer image may be provided using the optical system 10.

Figure 6:
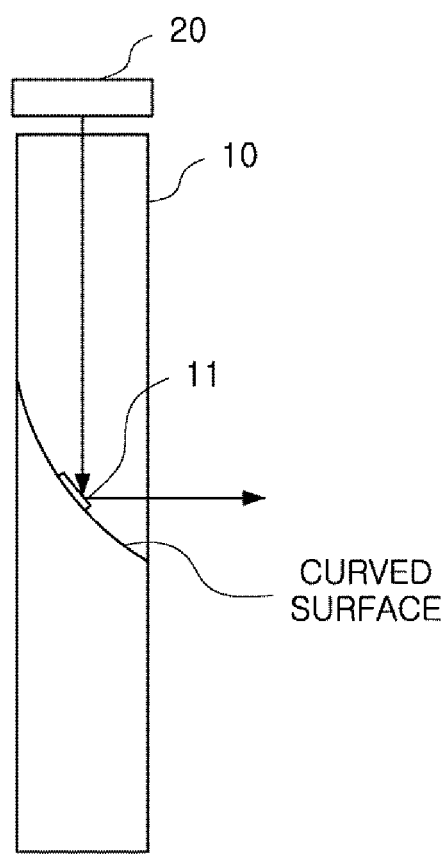
FIG. 6 is a view illustrating still another embodiment of the present invention.

FIG. 6 is a view illustrating still another embodiment of the present invention.

A reflective unit 11 according to the present invention generates a type of pinhole effect by increasing depth of field, as described above. In this case, the reflective unit 11 may perform the role of a focusing optical system, a reflective optical system, or an iris diaphragm simultaneously by adjusting the curvature, shape, location and/or the like of the reflective unit 11, and the curvature, shape, and location of the reflective unit 11 may be fabricated freely.

Referring to FIG. 6, it can be seen that an inclined surface on which the reflective unit 11 is famed is a curved surface other than a flat surface. Also, the reflective unit 11 is formed as a curved surface having a shape corresponding to that of the former curved surface.

In other words, the embodiment of FIG. 6 is manufactured in the same manufacturing process as the embodiments of FIGS. 2 and 3 except that the first surface 211 of the first optical element 121, on which the reflective unit 11 is formed, and the second surface 221 of the second optical element 122 (in the case of the first embodiment) or the inclined surface 211 of the optical element 121 (in the embodiment of FIG. 3) are formed as a curved surface(s) and the surface of the reflective unit 11 is also formed as a curved surface corresponding to the former curved surface.

Figure 7:
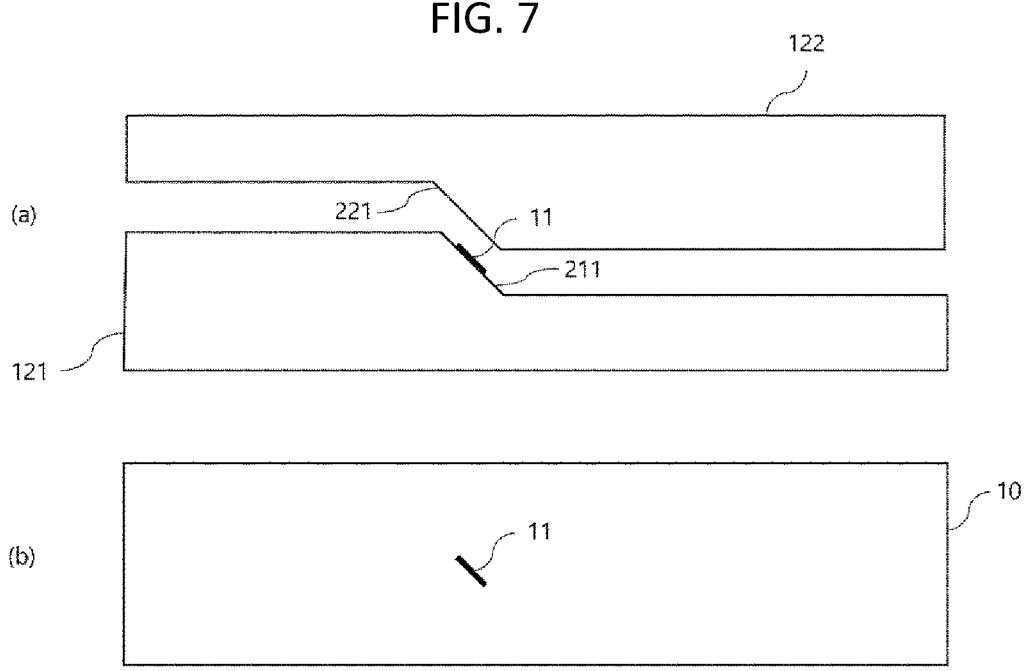
FIG. 7 is a view illustrating still another embodiment of the present invention.

FIG. 7 is a view illustrating still another embodiment of the present invention.

The embodiment of FIG. 7 is basically the same as the embodiment of FIG. 2 except that first and second surfaces 211 and 221, which are the pair of corresponding surfaces of first and second optical elements 121 and 122, are partially inclined with respect to the thickness direction.

In the embodiment of FIG. 2, the first and second surfaces 211 and 221 are entirely inclined along the thickness direction. In contrast, in the embodiment of FIG. 7, the first and second surfaces 211 and 221 are not inclined over the thickness direction entirely but are inclined over part of the thickness direction, unlike in the embodiment of FIG. 2.

As shown in FIG. 7(a), first and second optical elements 121 and 122 in which the first and second surfaces 211 and 221 are partially inclined with respect to the thickness direction. In the same manner described with reference to FIG. 2, a reflective unit 11 is formed on the first surface 211 of the first optical element 121. Furthermore, when the first and second optical elements 121 and 122 are brought into contact with and fastened to each other in the same manner described with reference to FIG. 2, the optical device 10 may be formed, as shown in FIG. 7(b).

Meanwhile, although the case where the optical device 10 is formed using two optical elements, i.e., the first optical element 121 and the second optical element 122, has been described in FIG. 7, an additional optical element, such as a third optical element, may be used. For example, there may be employed a third optical element having a shape in which a portion other than the first surface 211 of the first optical element 121 is divided. In this case, the third optical element may be brought into close contact with and fastened to the first optical element with an adhesive, and may be made of a material having the same refractive index as that of the first optical element.

Figure 8:
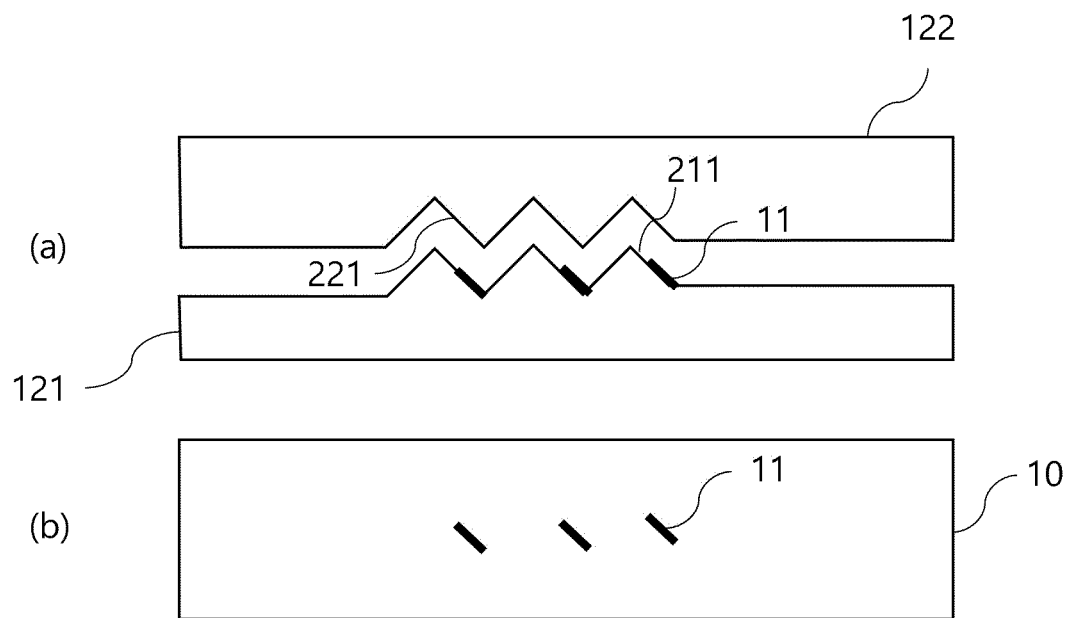
FIG. 8 is a view illustrating still another embodiment of the present invention.

FIG. 8 is a view illustrating still another embodiment of the present invention.

The embodiment of FIG. 8 is intended to form a plurality of reflective units 11. Compared with the embodiment of FIG. 2, the embodiment of FIG. 8 is characterized in that the pairs of corresponding surfaces of first and second optical elements 121 and 122 are plural. In other words, the embodiment of FIG. 8 is different from the embodiment of FIG. 2 in that a plurality of pairs of corresponding surfaces is formed.

As shown in FIG. 8(a), the plurality of first surfaces 211 of the first optical element 121 is formed in the shape of a plurality of saw teeth, and the plurality of second surfaces 221 of the second optical element 122 is formed in the shape of a plurality of saw teeth to correspond to the first surfaces 211 of the first optical element 121. When reflective units 11 are formed on the first surfaces 211 of the first optical element 121, respectively, and are brought into close contact with and fastened to the first surfaces 211 of the first optical element 121 with an adhesive, there may be formed an optical device 10 such as that shown in FIG. 8(b).

In this case, when the plurality of reflective units 11 is formed on the first surfaces 211, respectively, there may be obtained an optical device 10 in which the reflective units 11 are disposed in an array shape.

FIGS. 9 to 12 are views illustrating a process of forming the optical device 10 according to the embodiment described with reference to FIG. 8.

Figure 9:
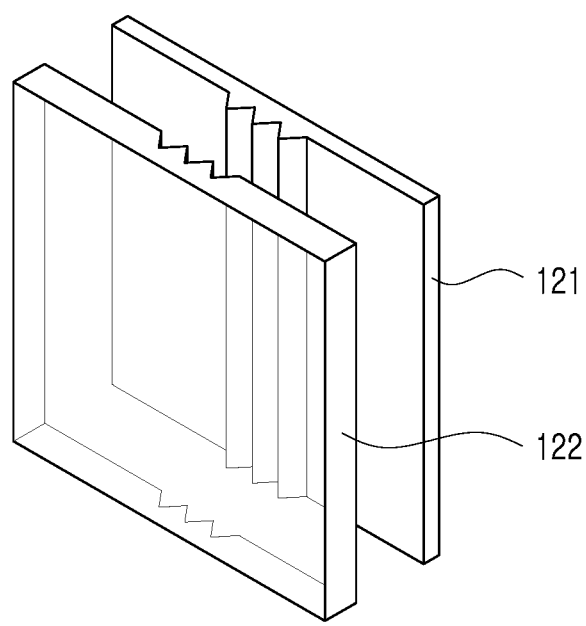
FIGS. 9 to 12 are views illustrating a process of forming the optical device (10) according to the embodiment described with reference to FIG. 8.
Figure 10:
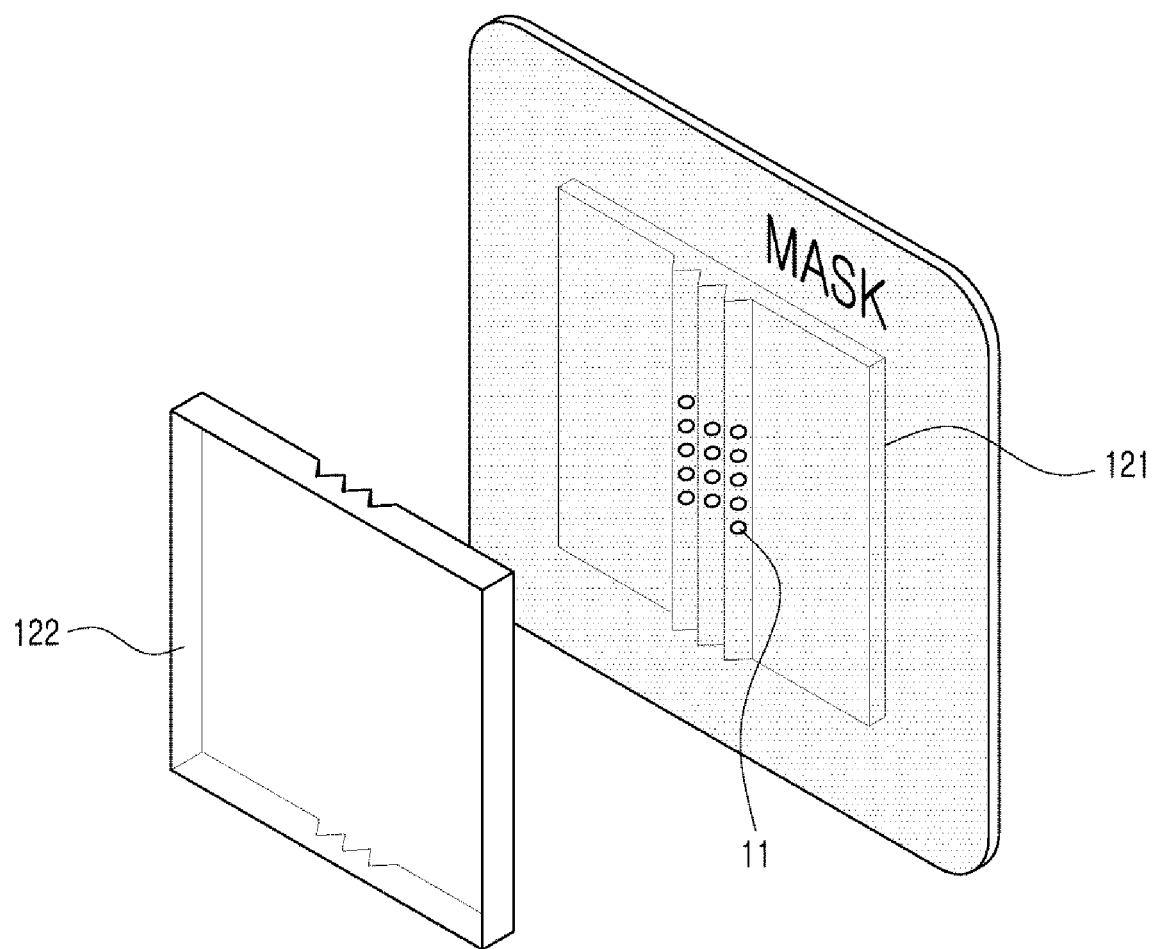
Figure 11:
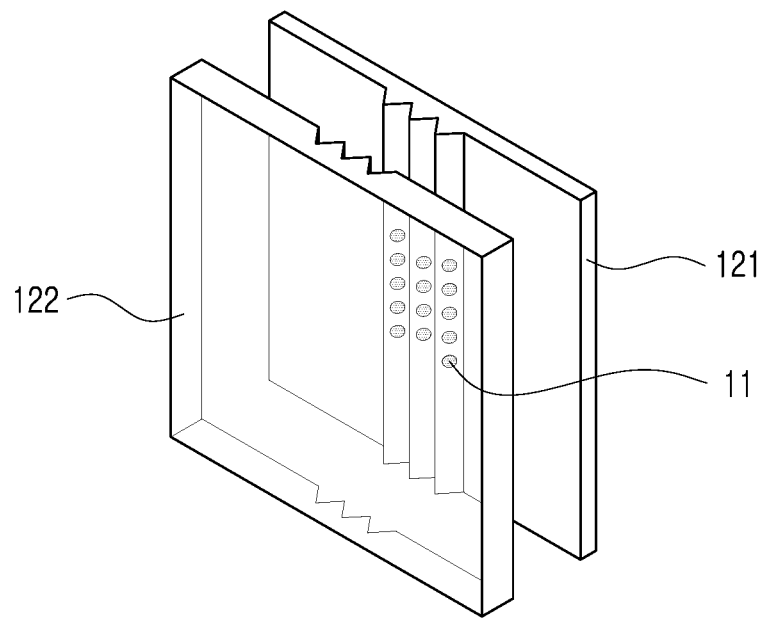
Figure 12:
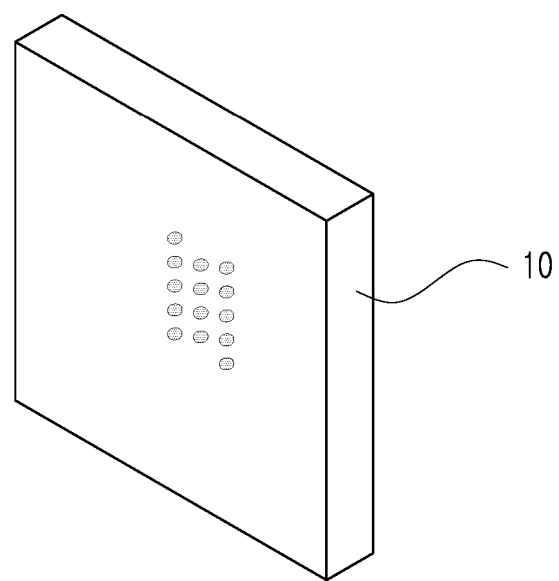

First, referring to FIG. 9, when first and second optical elements 121 and 122 in each of which corresponding surfaces are formed in a saw tooth shape are prepared as shown in FIG. 8 and reflective units 11 are formed on the respective first surfaces 211 of the first optical element 121 by a mask deposition method, as shown in FIG. 10, the reflective units 11 are disposed on the respective first surfaces 211 of the first optical element 121, as shown in FIG. 11. When the first optical element 121 and the second optical element 122 are brought into close contact with and fastened to each other with an adhesive, as described above, an optical device 10 may be obtained, as shown in FIG. 12.

While the present invention has been described based on specific matters, such as specific components, and limited embodiments and drawings above, this is provided to help the overall understanding of the present invention and the present invention is not limited to the above embodiments. Those having ordinary skill in the art to which the present invention pertains may attempt to make various modifications and alterations from the foregoing description.

Therefore, the spirit of the present invention should not be defined based only on the above-described embodiments, and not only the attached claims but also all modifications equal or equivalent to the claims may be considered to belong to the scope of the spirit of the present invention.

The invention claimed is:
1. A method of manufacturing an optical device, the method comprising:
preparing a first optical element and a second optical element each having a plurality of pairs of corresponding surfaces;
forming a plurality of reflective units on each of the surfaces of the first optical element out of the plurality of pairs of corresponding surfaces; and
forming an optical device by bringing the first optical element and the second optical element into close contact with each other and fastening the first optical element and the second optical element to each other, wherein each of the plurality of reflective units is made of a metal material and has a size of 8 mm or less, and wherein the plurality of reflective units having the size of 8 mm or less are formed on each of the surfaces of the first optical element by mask deposition so that the plurality of reflective units are disposed on each of the surfaces of the first optical element as to be spaced apart from each other and to form an array.

* * * * *